United States Patent [19]

Kantor

[11] Patent Number: 4,722,194
[45] Date of Patent: Feb. 2, 1988

[54] ABSORPTIVE THERMODYNAMIC APPARATUS AND METHOD

[76] Inventor: Frederick W. Kantor, 523 W. 112 St., New York, N.Y. 10025

[21] Appl. No.: 910,820

[22] Filed: Sep. 23, 1986

Related U.S. Application Data

[60] Continuation of Ser. No. 748,731, Jun. 25, 1985, abandoned, which is a continuation-in-part of Ser. No. 598,366, Apr. 9, 1984, Pat. No. 4,524,587, which is a continuation-in-part of Ser. No. 456,709, Jan. 10, 1983, Pat. No. 4,441,337, which is a division of Ser. No. 240,135, Mar. 31, 1981, Pat. No. 4,367,639, which is a continuation of Ser. No. 4,606, Jan. 18, 1979, abandoned, which is a division of Ser. No. 770,316, Feb. 18, 1977, Pat. No. 4,136,530, which is a division of Ser. No. 569,478, Apr. 18, 1975, Pat. No. 4,010,018, which is a continuation of Ser. No. 78,552, Oct. 6, 1970, abandoned, which is a continuation-in-part of Ser. No. 864,112, Oct. 6, 1969, Pat. No. 3,808,828.

[51] Int. Cl.$^4$ ............................................. F25B 15/00
[52] U.S. Cl. ....................................... 62/101; 62/476; 62/499
[58] Field of Search ............... 62/54, 100, 476, 499; 220/85 VR, 85 VS; 55/88, 89

[56] References Cited

U.S. PATENT DOCUMENTS

| | | | |
|---|---|---|---|
| 1,630,648 | 5/1927 | Wirth | 62/476 |
| 3,194,026 | 7/1965 | LaFluer | 62/88 |
| 3,270,524 | 9/1966 | McNeeley | 62/476 |
| 3,456,454 | 7/1969 | Kantor | 62/476 |
| 3,473,347 | 10/1969 | Andrews et al. | 62/476 |
| 3,559,419 | 2/1971 | Kantor | 62/476 |
| 3,608,331 | 9/1971 | Leondard, Jr. | 62/476 |
| 3,996,823 | 1/1967 | Novak et al. | 62/476 |

Primary Examiner—Ronald C. Capossela
Attorney, Agent, or Firm—Curtis, Morris & Safford

[57] ABSTRACT

Heat is transferred between conduit sections so as to use heat which otherwise would not be utilized and improve the efficiency of the apparatus and method. The sections contain working fluids flowing in opposite directions. Heat transfer longitudinally of the conduit sections is reduced relative to heat transfer transversely of the conduit sections. In a preferred embodiment, the conduit sections extend at an acute angle to the direction of the principal gravity or other acceleration field; that is, at an acute angle to horizontal in a stationary system, or at an acute angle to the radial direction in a rotary system.

20 Claims, 13 Drawing Figures

ABSORPTIVE THERMODYNAMIC APPARATUS AND METHOD

RELATED APPLICATION DATA

This is a continuation of application Ser. No. 748,731, filed June 25, 1985, now abandoned, which is a continuation-in-part of my co-pending U.S. patent application Ser. No. 06/598,366, filed Apr. 9, 1984, now U.S. Pat. No. 4,524,587, a continuation-in-part of application Ser. No. 06/456,709, filed Jan. 10, 1983, now U.S. Pat. No. 4,441,337; which is a division of Ser. No. 06/240,135, filed Mar. 31, 1981, now U.S. Pat. No. 4,367,639, which is a continuation of Ser. No. 06/4,606 filed Jan. 18, 1979, now abandoned, which is a division of Ser. No. 05/770,316, filed Feb. 18, 1977, now U.S. Pat. No. 4,136,530, which is a division of Ser. No. 05/569,478, filed Apr. 18, 1975, now U.S. Pat. No. 4,010,018, which is a continuation of Ser. No. 05/78,552, filed Oct. 6, 1970, now abandoned, which is a continuation-in-part of Ser. No. 04/864,112, filed Oct. 6, 1969, now U.S. Pat. No. 3,808,828.

FIELD OF THE INVENTION

This invention relates to thermodynamic apparatus and methods, and particularly to absorptive thermodynamic apparatus and methods.

This invention makes use of the impedance control and other features of the devices and methods shown in my above-identified pending patent application and my above-identified patents. Those patents and that application are hereby incorporated herein by reference.

OBJECTS OF THE INVENTION

Efficiency is a pervasive problem in thermodynamic systems and methods. It is an object of the present invention to provide a thermodynamic apparatus and method, and particularly an absorptive thermodynamic apparatus and method, in which the efficiency is materially improved.

SUMMARY OF THE INVENTION

In accordance with the present invention, the foregoing objectives are met by the provision of a thermodynamic apparatus and method in which heat which otherwise would not be utilized is transfered from one section of the conduit containing working fluid to another section, where it is utiziled in the thermodynamic process. Specifically, in a preferred absorptive thermodynamic device and method, heat is conducted from the absorber portion of the conduit in which gas is absorbed into a liquid, to the separator portion of the conduit, in which heat is added to drive the gas out of the liquid. Preferably, the two portions of the conduit are elongated and are in heat-transfer communication over a substantial portion of their lengths. Also preferably, the working fluids flow in opposite directions in those conduit sections.

It also is preferred that heat transfer longitudinally in the absorber and separator portion is greatly reduced relative to heat transfer transversely, thus ensuring proper operation of the device and method, and substantially aiding heat transfer.

The method and apparatus are usable in either a stationary or rotary thermodynamic system. Preferably, the conduit portions slope at an acute angle with respect to the direction of the principal gravity or other acceleration field; that is, at an acute angle with respect to horizontal in a stationary system, and at an acute angle with respect to the radial direction in a rotary system. This enhances the flow of liquid in the conduit due to the forces of gravity or other acceleration field. The conduits preferably are in side-by-side heat transfer contact, with the conduits sections arranged in a crossing pattern. The width of the bottom walls of the conduit section is much greater than the height. This makes the layer of liquid on the bottom wall relatively thin and substantially facilitates absorption of gas into or desorption of gas out of the liquid. Corrugations on the bottom walls introduce turbulence in the liquid to stir it and further improve transport of molecules by diffusion between the gas and liquid in the conduits. It should be understood that choice of slope for the flow surface depends on acceleration, e.g., 1g compared to 1000g. At a relatively high acceleration, the gas can be allowed to flow relatively rapidly across the free surface of a liquid without disrupting it. This applies also to pooled liquid: in a relatively high acceleration, waves move faster on the liquid's surface, so it takes a substantially higher gas velocity to produce travelling wave amplification.

The conduit walls preferably are made of a material having a relatively high conductivity with respect to flow of heat transversely to the conduit. Thus, heat transfer to and from the liquid is relatively good. However, because the liquid layer on the conduit bottom is thin, longitudinal heat transfer is relatively poor. This helps to ensure heat transfer in segregated zones at the temperatures needed for proper operation of the absorption process, and helps to increase the rate of heat transfer.

Vertical heat pipes using wicks and volatile liquids also are provided, in a stationary system, in order to further improve heat transfer.

A spring structure is provided for further enhancing heat transfer between gas and liquid.

The device is used to advantage in the simultaneous generation of electric power and cooling. Cold gas is delivered to a gas-driven turbine to generate electricity. The low temperature of operation permits the turbine to be made of materials which enable one to reduce the size and weight of the turbine.

The foregoing and other objects and advantages of the invention will be set forth in or apparent from the following description and drawings. Certain of the drawings have been carried forward from by above-identified co-pending U.S. patent application. Those figures have been given the same figure numbers, and the reference numerals have been retained unchanged, except as otherwise noted. New drawings and reference numerals in this application are given numbers following those used in my co-pending U.S. patent application.

ABSORPTIVE-DESORPTIVE COUNTER-CURRENT HEAT EXCHANGE HEAT-FLOW SPLITTER

Figure 76A:
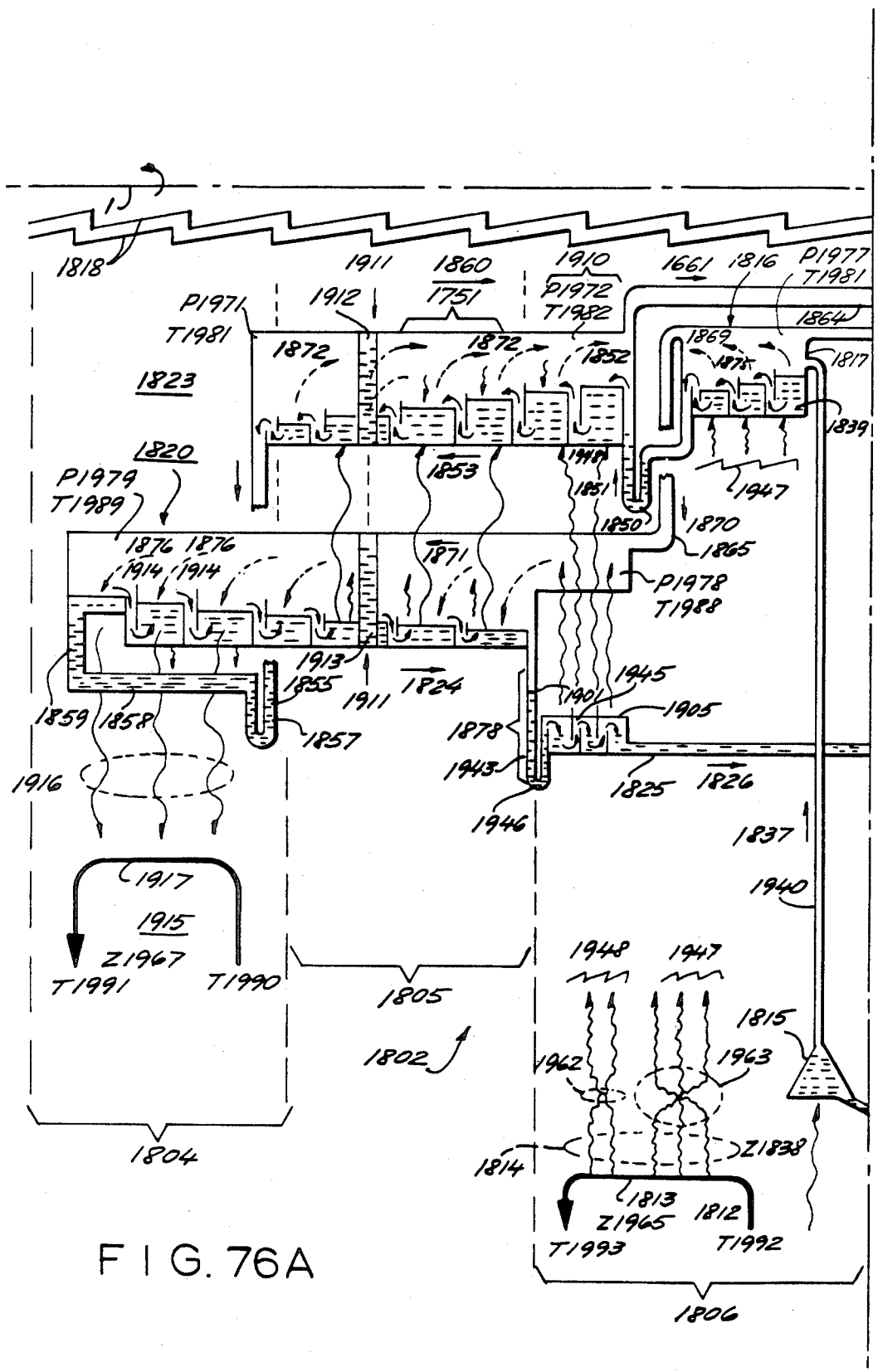
FIGS. 76A and 76B together comprise a schematic drawing of a rotary thermodynamic apparatus incorporating the invention.
Figure 76B:
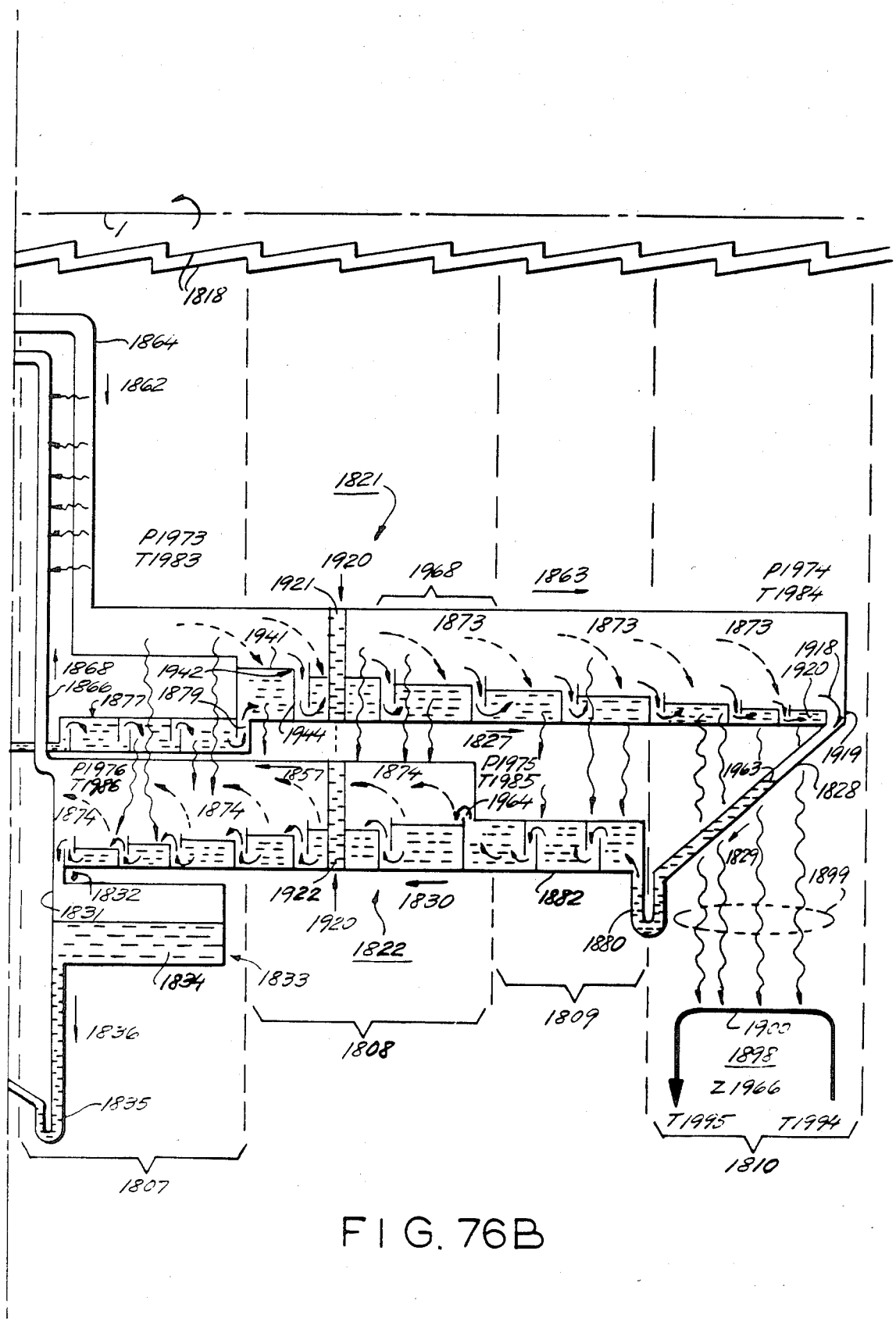
Figure 77:
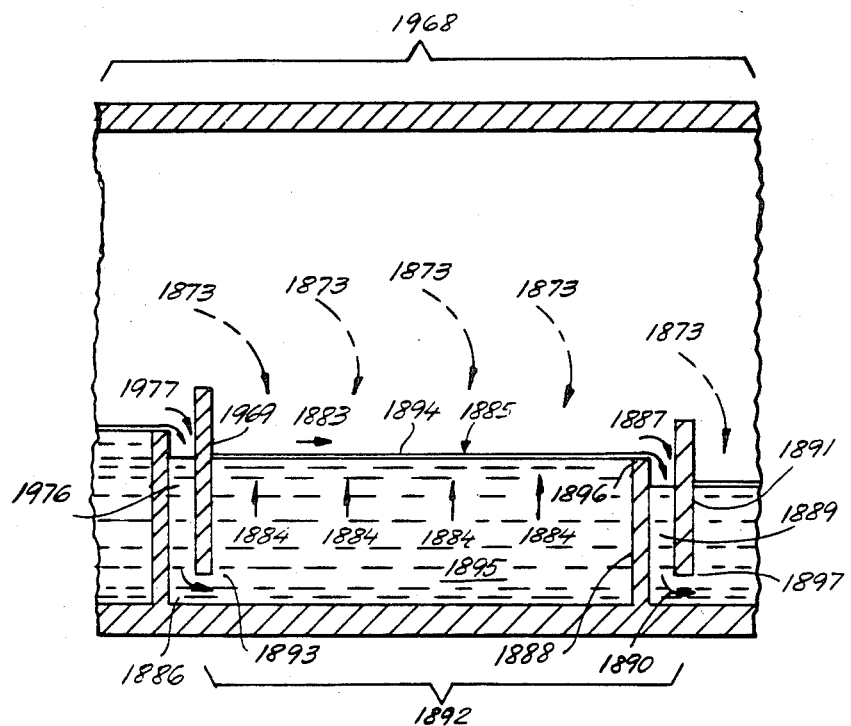
FIGS. 77 and 78 are schematic cross-sectional views of the structure shown in FIGS. 76A and 76B.
Figure 78:
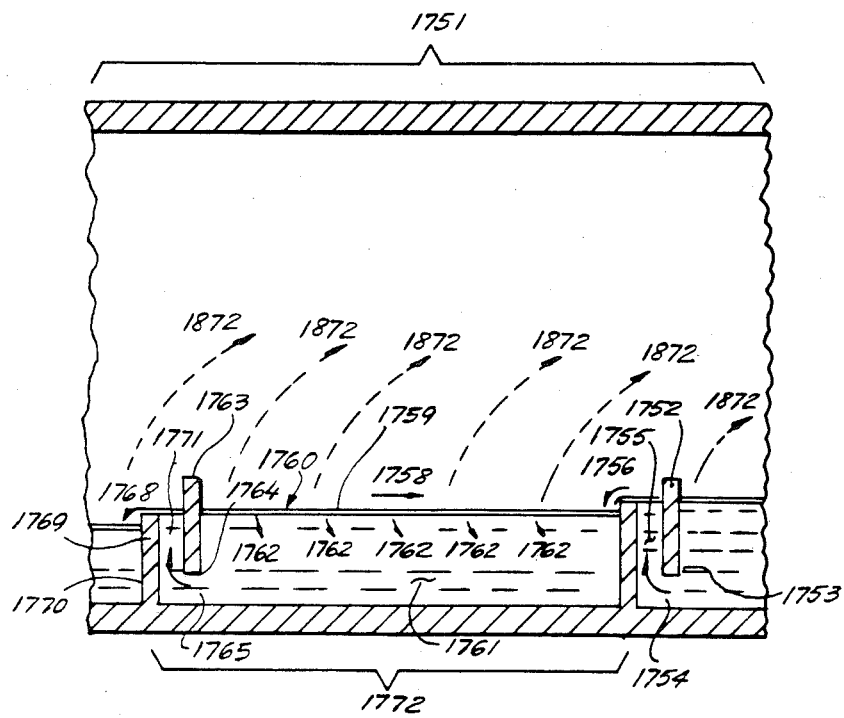

This method and apparatus, as depicted schematically in FIGS. 76 (comprising FIGS. 76A and 76B), 77, and 78, is for the purpose of accepting heat from a heat source at an intermediate temperature and rejecting a portion of that heat to a heat sink at a lower temperature while delivering another portion of that heat to a heat sink at a temperature higher than the input temperature. In doing this, this system contains provisions for it to be self-adjusting so as to use the energy provided by the flow of heat from the intermediate temperature heat source to the lower temperature heat sink to drive the pumping of heat from the intermediate input source to a higher temperature output. In FIGS. 76, 77, and 78 are presented additional means for implementing rotary inertial thermodynamic absorption cycle processes, which may variously be advantageously used in relation to apparatus, methods, and/or functions depicted in, by way of example and without limitation, my copending U.S. patent application Ser. No. 598,366, now U.S. Pat. No. 4,524,587.

Device 1802 in FIG. 76 uses an absorption cycle, in which the concentration of the more volatile component is altered in a set of co-operating ways, so as to cause the flow of heat from the intermediate-temperature heat-input to the lower-temperature heat-output to provide and maintain a difference in gas pressure of the more volatile component; this pressure difference is then used to maintain a difference of concentration in the liquor as it flows through counterflow heat exchange to and from the higher temperature portion of the system while in contact with the gas. In this way, relatively highly concentrated liquor may be produced and brought to a temperature near that of the hot-end heat-load; this liquor is then able to absorb the more volatile component at the higher of the gas pressures, and, by absorption of some of that gas, rise to a temperature high enough for heat to flow out from it and into the hot-end heat-load.

Figure 79:
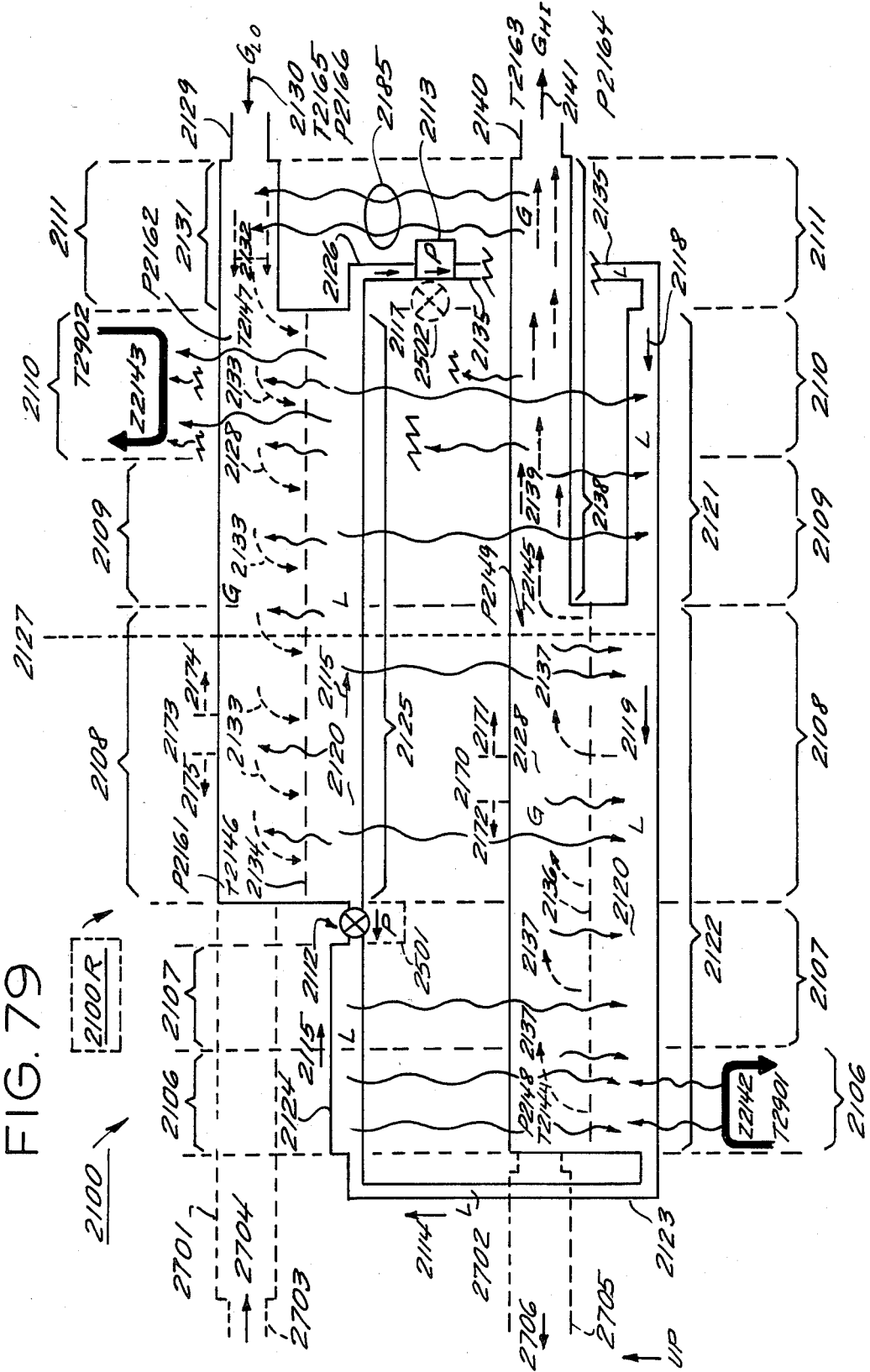
FIGS. 79 and 80 are schematic drawings showing further embodiments of the invention.

This procedure may be regarded as using a heat driven gas pump of the general type discussed further herinafter with regard to system 2100 in FIG. 79, operating to produce and maintain a gas pressure difference by pumping gas, which gas is then used in a reversal of substantially the same process to pump heat from the heat input to the desired higher temperature. Various of the means discussed in regard to FIGS. 76, 77, and 78 might also be advantageously used in implementing thermodynamic processes not only in a rotating system but also in systems which are at rest on the earth's surface and/or for other applications.

In a rapidly rotating system, the much larger centrifugal forces are used rather than gravity for keeping gases and liquids in their appropriate places. In a system rotating at about 3,000 revolutions per minute, the acceleration near the axis of rotation, expressed in terms of earth's surface gravity g, increases approximately as 100.64 g per centimeter of distance away from the axis. As has been discussed above, and as may be seen in FIGS. 26, 28, 50, 52, 58, and 73 of my copending patent application Ser. No. 598,366, this makes it feasible to stand off substantial pressure differences by using conveniently small liquid traps, for example, traps smaller than those used in ordinary plumbing near the earth's surface. For example, in a system rotating at about 3000 RPM, at about 10 cm. away from the axis of rotation, one atmosphere of pressure difference can be stood off by an offset in radial position of slightly less than one centimeter in a trap using water as the liquid. Similarly, conveniently large pressure differences can be obtained by using a lift tube as a pumping means; pressure differences of 6 atmospheres or more can be readily obtained. With this ease in obtaining and blocking such high gas pressures, a variety of combinations of liquor and volatile component can be used without needing to use a buffer gas, although buffer gases might be used if desired.

Some of the special characteristics which are thus obtained are of value for performing various specific thermodynamic processes. By way of example and without limitation, when ammonia is absorbed in water, or when water is absorbed in a salt solution such as aqueous LiI, LiBr, LiCl, ZnBr2, CaBr2, CaCl2, such other vapor-pressure-reducing chemical liquors as sulphuric acid or various bases, and/or the like, the density of the resulting more-dilute solution is less than that of the original solution. Because of the slow rate of diffusion, it is then desirable to expose fresh liquor so as to absorb more gas.

However, with the combination of teraethyleneglycoldimethyl ether (CH3 O CH3(CH3 O CH3) CH3 O CH3; 'TEGDME') as the less volatile component (boiling point of about 275.8 C (page C-512 of 'Handbook of Chemistry and Physics,' 58th edition, 1977–1978, CRC Press, Inc., Cleveland, Ohio 44128)) and, by way of example and without limitation, dichloromonofluoromethane (CHC13F; refrigerant 21) as the more volatile component (boiling point of about 8.92 C (page E-34, op. cit.)), the solution shows an increase in density when the gas is absorbed. For this reason, especially in a relatively high acceleration field, during absorption, the more dilute solution has a tendency to sink, leaving the exposed surface of the absorbing liquor able to remain effective for absorbing additional gas, thus bypassing various problems arising during absorption from the slowness of d iffusion of the absorbed molecules such as may be seen in using various of the previously mentioned liquors for absorption. Moreover, in the desorption process, the liquor would become less dense and form a thin layer on the free surface closest to the axis of rotation (the "top"), at which location it can readily receive heat needed to drive the desorption process, which heat could, for example, be delivered to that top layer by convective transport of the liquor situated radially outward ("below") it. With use of overspills as discussed herein, density changes due to chemical composition within this portion of liquor situated below the "top" layer would, under proper operating conditions, advantageously be kept smaller than density changes due to temperature changes, thus providing a thermodynamic environment in which convection could carry needed heat to the top layer to drive desorption. In a rapidly rotating system, centrifugal effects can provide an acceleration much larger than that of the earth's surface gravity, greatly augmenting such convection. This large augmentation facilitates use of materials with desirable thermodynamic properties, but whose viscosity would be and/or has been regarded as too great for use in 1 g.

Using specific rotary inertial thermodynamic means, the thin, upper surface can readily be stripped from the liquor, exposing fresh liquor moving radially inward ('rising' from 'below').

More specifically, FIG. 76 depicts in schematic form a heat-driven heat-pump, configured to divide input heat into two portions, and deliver them respectively to higher-and lower-temperature heat loads. The sytem, generally designated 1802, is depicted as rotating about axis 1. Jagged lines 1818 are to indicate that device 1802 is placed suitably far away from axis 1. The configuration of FIG. 76 has been drawn to depict flow relations which would be advantageous for use with a liquor and gas combination in which the density of the liquor is decreased by absorption of the gas and dilution of the liquor, for example, such as those mentioned above. Wavy lines have been used in FIGS. 76, 77, and 78 to generally designate heat flow each in the direction indicated by the arrowhead(s).

Device 1802 may be regarded as having two major internal countercurrent heat exchangers, made up of four major chambers, which chambers are generally designated 1820, 1821, 1822, and 1823, through which liquid passes in generally a figure '8' pattern; chambers 1820 and 1823 are coupled for heat exchange, and chambers 1821 and 1822 are coupled for heat exchange. Liquid passes through chamber 1820 in the direction of arrow 1824; then through trap 1878, which trap is made up of 'J'-tube 1943, heat exchanger 1905, tube 1825, heat exchanger 1877, and spill barrier 1944 in chamber 1821, in which trap is depicted liquid level 1901 offset relative to the next free surface 1941 in chamber 1821 to indicate that, with the pressures present in chambers 1820 and 1821, the spill rate into trap 1878 is not as great as the pressure difference would be able to drive the flow of liquid in that direction (flow rate here is controlled by lift tube pumping and spilling, not necessarily by hydraulic equilibrium, and trap 1878 is standing off a gas pressure difference); this trap feeds into liquid-filled countercurrent heat exchanger 1905, which is positioned at a radial location such that the total fluid pressure to which the liquid within it is subjected is sufficient to assure that it is filled only with liquid and does not release any gas absorbed in the liquor; then through connecting tube 1825 in the direction indicated by arrow 1826; then through counterflow heat exchanger 1877, also positioned with radial location to assure that it contains only liquid during intended operation; the liquid flows radially inward from heat exchanger 1877 to enter chamber 1821 through inlet 1879; then through chamber 1821 in the direction indicated by arrow 1827; then tube 1828 in the direction indicated by arrow 1829, passing through trap 1880 of which tube 1828 and heat exchanger region 1882 are part, in which trap the free surface 1963 is offset relative to the next free surface 1964 in chamber 1822; then into the counterflow heat exchanger liquid preheat region 1882 of chamber 1822; through chamber 1822 in the direction indicated by arrow 1830; then substantially radially outward through tube 1831 in the direction of arrow 1832 into reservoir 1833 which is partly filled with liquid 1834; then through trap 1835 in the direction indicated by arrow 1836; then into heating chamber 1815 in which it is heated by heat from heat input 1812 supplied through impedance Z1838, which impedance might be suitably controlled to control liquid flow rate (see also chamber 679, impedance Z677, and heat source 678 in FIG. 52); then into lift tube 1940, in which the combination of liquid and evolved gas proceeds relatively rapidly radially inward in the direction indicated by arrow 1837; this mixture of gas and liquid enters separater 1816 through inlet 1817, which inlet 1817 is here depicted as a simple inlet tube curved to discharge in a radially outward direction but which may be provided with mist trapping means (not shown here to avoid clutter to FIG. 76), in which separator 1816 this mixture is separated into liquid 1839 and gas 1840; this liquid 1839 then proceeds through trap 1850 in the direction indicated by arrow 1851, entering chamber 1823 through inlet 1852; then proceeds through chamber 1823 generally in the direction indicated by arrow 1853 and exits by spilling through outlet 1854; then flows through tube 1855 in the direction indicated by arrow 1856, passing through trap 1857 and counterflow heat exchanger 1858 to reenter chamber 1820 through inlet 1859. Note that tube 1855 may be used as a portion of trap 1857, depending on various geometric, chemical, density, pressure, temperature, mechanical impedances, viscosity, thermal impedances, rotary inertial thermodynamic impedances, and angular velocity parameters, as set forth more fully above.

The regions which contain gas in chambers 1823 and 1821, together with connecting tube 1864, form a single connected gas cavity, within which gas flows generally from left to right in the directions indicated by arrows 1860, 1861, 1862, and 1863. This gas is evolved in chamber 1823 and absorbed in chamber 1821. In producing this flow, pressure P1971 would be slightly greater than pressure P1972; because of centrifugal forces acting on gas within this single gas cavity, and the different distances from axis 1, P1972 would not necessarily be greater than P1973; and P1973 would be slightly greater than P1974.

A separate gas cavity is made up of chambers 1820 and 1822, together with separator 1816 and connecting tubes 1865 and 1866, in which gas flows generally from right to left in the directions indicated by arrows 1867, 1868, 1869, 1870, and 1871. This gas is evolved in chamber 1822 and separator 1816, and absorbed in chamber 1820. In producing this flow, P1975 would be slightly greater than P1976; because of centrifugal effects on gas density, P1976-P1977 may be greater than P1975-P1976 and P1977 may be greater than or less than P1978, depending on operating conditions; and P1978 would be slightly greater than P1979.

Evolution of gas in chamber 1823 is generally designated by dashed arrows 1872. Absorption of gas in chamber 1821 is generally designated by dashed arrows 1873. Evolution of gas in chamber 1822 is generally designated by dashed arrows 1874. Evolution of gas in separator 1816 is generally designated by dashed arrows 1875. Gas evolved in the operation of lift tube 1940 enters into separator 1816 through inlet 1817, and mixes with other gas present in separator 1816. Absorption of gas in chamber 1820 is generally designated by dashed arrows 1876.

For the thermodynamic process of device 1802, generally the gas pressures in chambers 1823 and 1821 are substantially less than those in chambers 1820 and 1822 and separator 1816.

In FIG. 77 is depicted (not to scale) in more detail a portion 1892 from region 1968 of chamber 1821, to indicate more specifically the aforementioned relation between gas absorption, fluid density, and flow distribution. Coming in the direction designated by arrow 1997 from the preceding portion of chamber 1821, relatively more concentrated liquor 1996 enters portion 1892 through inlet 1893, to join with liquor 1895 already present in portion 1892, preceeding generally in the direction indicated by arrow 1886 to enter near the portion of the liquor 1895 furthest away from the axis 1 of rotation. Absorption of gas, generally indicated by dashed arrows 1873, results in the formation of a thin region 1894 near the radially inward surface 1885 of liquor 1895 that has less density than the more concentrated liquor lying just a small amount further away from the axis 1. It is desired that operation of chamber 1821 result in the absorption of gas and dilution of liquor as the liquor moves generally in the direction indicated by arrow 1827. This thin layer of dilute liquor has relatively little ability to provide rapid absorption of additional gas, and the slowness with which the absorbed gas molecules diffuse further into the bulk of liquor 1895 would present a highly undesirable impedance to such further absorption if this thin layer of diluted liquor were to remain nrear the exposed surface and cover the liquor.

The inflow of liquor 1996 in the direction indicated by arrow 1886 provides a pressure pushing the exposed surface of liquor 1895 radially inward in the direction generally designated by arrows 1884. The liquor provides in effect a lubricated surface along which the unwanted layer 1894 could move. By allowing this layer 1894 to spill over the radially inward edge 1896 of spill barrier 1888 in the direction indicated by arrow 1887, the relatively large acceleration field appearing in the frame of reference of the rotating system can be utilized to provide severe shearing forces to strip the unwanted layer 1894 from the inward surface of liquor 1895 by flow of layer 1894 in the direction designated by arrow 1883, thus exposing fresh liquor flowing radially inward in the direction generally designated by arrows 1884. This diluted liquor 1889 then flows radially outward before passing the radially outermost edge 1897 of flow barrier 1891, proceeding generally in the direction indicated by arrow 1890. This flow pattern is called here 'overspill', and flow of this form may be called 'overspill flow' or 'overspill', and such flow control means may be called an 'overspill barrier'.

As depicted in FIG. 76 for chamber 1821, a multiplicity of overspill barriers can be arranged so as to provide for the selection of the diluted layer 1894 from each region 1892 and pass it into the next such region as the most concentrated liquor in that next region. By repeating this process, a relatively very large ratio of concentration change in the liquor can be easily achieved in a relatively small region, using relatively simple apparatus. This absorption of gas is used to produce heat in chamber 1821, some of which heat is used for heating gas and liquid in chamber 1822, and some of which is rejected into the low-temperature heat sink generally designatd by 1898, which portion of heat flow is generally designated by wavy arrows 1899.

This procedure of overspill is reversed in chambers 1822 and 1823, in which gas is evolved from the liquor as it is heated and concentrated. In FIG. 78 is depicted (not to scale) in more detail a portion 1772 of region 1751 of chamber 1823; this reverse operation of the flow is called 'underspill'. In this case, dilute liquor 1755 would be provided from the radially outermost region of the adjoining portion, which liquor 1755 is selected by position of radially outermost edge 1753 of flow barrier 1752, at which radially outermost region said liquor has a relatively high concentration compared to other liquor in that portion, and liquor 1755 would flow in the direction indicated by arrow 1754. This dilute liquor 1755 would move radially inward, and be delivered in the direction indicated by arrow 1756 to spread generally in a direction indicated by arrow 1758 and form a thin, dilute layer 1759 supported by the denser liquor 1761 situated radially outward from it. Being thin, this dilute layer 1759 would not present a great obstacle to the diffusion of gas molecules and the evolution of gas from the surface 1760, which gas would then leave generally in the direction indicated by arrows 1872. The resulting denser liquor, being acted on by centrifugal acceleration effects which could advantageously be much larger than 1 g, would tend to move radially outward in the direction generally indicated by arrows 1762, leaving room for more of the dilute liquor 1755 to flow onto its surface. After this more concentrated liquor had been centrifuged out toward the outermost region of liquor 1761 in portion 1772, it would exit through outlet 1764 in the direction indicated by arrow 1765, available as liquor 1771 to move in the direction indicated by arrow 1768 in the next neighboring portion to repeat the process, leading to yet higher concentration. Thus, this behavior of an underspill portion can be used with a sequence of underspill barriers for the cascaded concentration of liquor and evolution of gas. This is depicted in FIG. 76 for chambers 1822 and 1823. It is noted here that the effect can easily be made so large that, when using salt solutions, suitable care should be taken to avoid cyrstallization of salt from the liquor.

Note that the use of overspill or underspill flow depends in part on whether the absorption of vapor makes the liquor less dense or more dense. FIG. 76 depicts an arrangement of overspills and underspills for use with a combination of liquor and vapor for which absorption of vapor makes the liquor less dense. However, if one were to use a combination of liquor and vapor with which absorption of gas made the liquor more dense, an example of which is given above, then the roles of the two types of spills would be interchanged; in FIG. 76, chambers 1820 and 1821 would then use underspills, and chambers 1822 and 1823 would then use overspills.

Use of overspills and underspills to control distribution of portions of the liquor having density substantially different from that within the portion defined by the preceding and following spill barriers helps provide for a degree of homogeneity of liquor in a portion of the midrange between the innermost and outermost portions of that liquor such that density differences due to differences in temperature can relatively easily be greater than differences in density due to differences in chemical composition, thus advantageously facilitating convective transport of heat within, into, and/or out of, the liquor. For example, this may advantageously be used in transporting heat between chambers 1820 and 1823, between chambers 1821 and 1822, into chamber 1823 and separator 1816, and out of chambers 1820 and 1821.

This use of overspill and/or underspill flow barriers for facilitating convective transport of heat by providing a region in which thermal effects on liquor density exceed chemical effects on liquor density thus provides a way in which not only the mass-flow impedance but also the thermal impedance in a rotary inertial thermodynamic device can be advantageously controlled and decreased. Thus, these overspill and underspill flow barriers are rotary inertial thermodynamic thermal impedance control means, being means operable in a rotary inertial thermodynamic system for controlling molecular diffusion flow impedance by controlling thickness and position of regions with increased or decreased concentration during absorption and/or desorption; for controlling convective transport of mass and heat; and for controlling coupling between a flow of heat and a flow of mass which takes place as a gaseous component is absorbed into, or desorbed from, a liquor.

In the range of 1 g to at least a few times ten thousand g's, for larger centripetal acceleration to which a liquid is subjected, the effectiveness of differences in density in driving convective motion within the liquid is larger. Thus, at an acceleration of 1,000 g, a density difference due to a temperature difference of one millidegree C is about as effective in driving convection of water as is one degree C at an acceleration of 1 g. Because of this, the usual assumption made in designing apparatus for use at 1 g, that liquid will move by laminar unidirectional flow or as a turbulent slug through a horizontal counter-current heat exchanger, and so pass sequentially through a set of substantially different temperatures, does not necessarily remain valid at accelerations substantially greater than 1 g. Instead, the convective behavior can dominate, and what were intended to be distanct temperature zones so be put into undesired communication with each other. Thus, one of the concepts widely used in treating mechanical flow impedance can be inappropriate, and the rotary inertial thermodynamic properties of transporting the fluid through a range of temperatures become dominant. That this takes place arises from this interrelationship among acceleration, heat flow impedance, thermal expansion, and effects of the resulting greatly increased convection on the gross behavior of the flow of a liquid at substantially the same distance from the axis of rotation ('height') in the acceleration field. This can lead to a substantial alteration in the impedance to flow of a fluid in passing at substantially the same distance from said axis ('horizontally') through a range of proximate zones of substantially different temperatures, and is a rotary inertial thermodynamic impedance which can be used advantageously and which, if not properly controlled, can substantially detract from the operation of a device. Figures 76, 77, and 78 depict ways in which this rotary inertial thermodynamic impedance can be controlled by the use of overspills and/or underspills as set forth herein; for example, with respect to counterflow heat exchangers containing only liquid, counterflow heat exchangers 1905, 1877, and 1882; and with respect to counterflow heat exchangers containing both gas and liquid, chambers 1820, 1821, 1822, and 1823 and separator 1816.

Depending on operating conditions, choice of working fluids, and directions of flow of heat and of fluids, in steady operation, a series of overspills might not require that the successive free surfaces of the liquor in the successive portions be stepped radially outward along the general direction of flow of the liquor, because, for example, the overspilled liquor could be moving into a region in which the liquor was already less dense, for example, because of temperature difference and/or concentration difference, than the incoming liquor and there would not be an incrementally larger back-pressure against the introduction of the material into the radially outermost region of the liquor already present. In FIG. 76, the overspills depicted for chambers 1820 and 1821 are depicted as providing for the formation of liquor free surfaces which are stepped radially outward; this would facilitate relatively rapid start-up and relatively rapid recovery from undesired disruption of normal operation.

Operating Cycle

Under operating conditions, respective temperatures $T1991 > T1990 > T1992 > T1993 > T1995 > T1994$; and respective pressures $P1979 > P1971$. Heat enters through heat source impedance Z1965, which impedance is treated here as being suitably small, with heat transport from that heat source (not shown) generally indicated by arrow 1813 conveying heat from input lcoation 1812 starting at temperature T1992. Heat is delivered to device 1802 as generally indicated by wavy arrows 1814, with counterflow heat exchange taking place in zone 1806, with the heat transport medium leaving at a lower temperature T1993. Some of this input heat is used to drive lift tube 1940, as discussed above. Operation of lift tube 1940 provides the pumping action that drives liquor around its said figure '8' loop. Another portion of the input heat is delivered to separator 1816, partly to facilitate such further evolution of gas as might occur at the pressure P1977 and temperature T1987 in separator 1816. As indicated by the crossing of wavy arrow lines in region 1963, heat would be delivered to separator 1816 from heat carrier 1813 in a countercurrent relationship. For clarity, these wavy arrows are broken at jagged lines 1947 near region 1863 and near separator 1816. A substantial portion of the input heat would be delivered to region 1910 of chamber 1823, and used there to maintain the temperature of the liquor and the evolved gas as the liquor made the transition from the relatively high gas pressures in chamber 1822 to the substantially lower gas pressures in chamber 1823. This provides a way in which a substantial amount of energy may advantageously be coupled into device 1802 at a relatively low temperature and without requiring large excursions of temperature. Wavy arrows designating this flow of heat from carrier 1813 to region 1910 cross in region 1962 to designate the counterflow for delivery of heat to evolve gas in chamber 1823. For clarity, these two wavy arrows are broken by two jagged lines 1948 near region 1962 and near region 1910 of chamber 1823.

This heat input is able to provide two major results: it can supply a substantial change in chemical concentration, so that the liquor in chamber 1823 can be substantially more concentrated than that in chamber 1820 for each temperature through which both go as the fluids pass through the working cycle, and it can provide all the mechanical pumping power used, with remarkable simplicity and ease.

Gas evolved in chamber 1823 flows generally in the direction indicated by arrows 1860, 1861, and 1862, to be delivered into chamber 1821 as discussed above. As it flowed, it would give up some of its heat to the liquor flowing in the other direction, in counterflow heat exchange. Chambers 1823 and 1820 are in close thermal contact, which in rotary inertial thermodynamics can be accomplished in many ways. Various ways in which this may be implemented in relatively high acceleration fields, and various considerations involved in doing so, have been discussed more fully above. As an illustration of relative locations with the respective chambers at which heat exchange might be implemented, the gases and liquids in both chambers 1820 and 1823, for example at location 1911, might be coupled through augmented convective heat transport with vanes 1912 and 1913, or, as depicted in FIG. 57 chambers 1820 and 1823 might be arranged at substantially the same radial distance from axis 1 and thermally coupled through a membrane separating their respective fluid contents so as to prevent mixing. Similarly, thermal coupling amoung the gases and liquids in chambers 1821 and 1822 at location 1920 is generally indicted by fins 1921 and 1922, with the understanding that many configurations and methods for obtaining such thermal coupling, including without limitation those set forth elsewhere herein and/or other configurations and methods, might be used, without departing from the scope of the invention.

As liquor progressed generally in the direction indicated by arrow 1853, it would be heated by heat received from chamber 1820 through countercurrent heat exchange. While it was being heated in this way, the liquor in chamber 1823 would pass through a sequence of underspill barriers, to facilitate both the evolution of gas and the concentration of liquor, all of this being done at a relatively low gas pressure of approximately P1971.

This relatively highly concentrated and hot liquor would then leave chamber 1823 through outlet 1854, proceeding through tube 1855, trap 1857, and counterflow heat exchanger 1858, so as to enter chamber 1820 at the hot end of chamber 1820 through inlet 1859. Under typical steady operation, this would be the most concentrated liquor in the device 1802. Starting from that end of chamber 1820, the concentrated liquor would absorb gas at relatively high pressure P1979 and starting at a relatively high temperature T1989, while proceeding through a series of overspill barriers 1914 and as otherwise shown in FIG. 76. This absorption at a relatively high gas pressure by a relatively concentrated liquor can deliver heat at a relatively high temperature T1989. Delivery of such heat to a high temperature heat load is generally designated by wavy arrows 1916. This high temperature heat load is generally designated 1915, comprising arrow 1917 depicting a countercurrent flow entering at temperature T1990 and leaving at temperature T1991 > T1990. The region in which this delivery of heat would take place is generally designated as zone 1804.

After leaving zone 1804, liquor in chamber 1820 could still be sufficiently concentrated for it to be able to absorb gas at a temperature higher than T1992. This would take place in zone 1805, in which heat produced by that absorption would be used to heat liquor flowing in the other direction in chamber 1823, and to heat high pressure gas flowing toward zone 1804. Also, the stored heat in the liquor would be used to provide heat to those same destinations. This would provide heat used in chamber 1823 for producing the highly concentrated liquor used in zone 1804.

After liquor in chamber 1820 had become too dilute for this use, it would pass through trap 1878 and into counterflow heat exchanger 1905, where it would deliver some more of its stored heat to chamber 1823 for use in concentrating liquor and to high pressure gas in chamber 1820 moving toward zone 1805 (and zone 1804). In counterflow heat exchanger 1905, the liquor would pass through a series of underspill barriers. In this case, the underspill provides for selection of the cooler, and therefore more dense, part of the liquor in each portion of the heat exchanger. Because the relatively high acceleration field present in a rapidly rotating system can severely augment convection, the use of underspills and overspills for the maintenance of segregated heat exchange portions appears to be highly advantageous, in constructing countercurrent heat exchangers for use in rotary inertial thermodynamic devices, especially when relatively large temperature differences between input and output are desired within a small distance, and for maintaining segregated absorption and desorption portions; this can be used in combination with various other methods and devices set forth herein, such as device 5000 in FIG. 57 and system 1400 in FIG. 56, and/or in permutations in which it is used instead of other forms presented.

After passing through counterflow heat exchanger 1905, the cooler liquor would proceed through tube 1825 to counterflow heat exchanger 1877 in zone 1807. With its remaining concentration, this liquor would still be too warm to absorb gas at about pressure P1973. In heat exchanger 1877, the liquor would give up more of its remaining heat, but now to chamber 1822, where it would be used for evolving gas at relatively high pressure, approximately P1976, from liquor flowing generally in direction 1830, and for heating such gas as it moved toward zones 1806 and 1805.

After the liquor had given up enough of its remaining heat to be able to absorb gas at the gas pressure present in the low pressure gas cavity, it would flow on into chamber 1821, in zone 1808. This liquor might still be substantially warmer than T1995, so some of its stored heat would be used for heating gas and liquor in chamber 1822. In the absorbing of gas in chamber 1821, heat would be produced. This heat, too, would be used for heating gas and liquor in chamber 1822. At each of these portions of chambers 1821 and 1822, matching conditions of ability to absorb gas near a temperature in chamber 1821 and ability to release gas if heated near that temperature in chamber 1822 would be automatically self-matched, with the matching arising in the form of a displacement along the counterflow paths until conditions were appropriate.

After further absorption of gas, the liquor in chamber 1821 would become unable to further absorb gas at the relatively low pressure in chamber 1821 at a temperature high enough to drive the evolution of gas from liquor flowing in substantially the other direction in chamber 1822. Then, further heat released from chamber 1821 that is delivered to the counterflow in chamber 1822 would be used to preheat liquor, to raise its temperature to be high enough to be able to deliver gas at the required pressure. This would take place in zone 1809, while liquor in chamber 1821 continued to absorb gas at relatively low pressure, and the heat from that zone in chamber 1821 would be used for heating liquor in counterflow heat exchanger 1882.

This use of heat from chamber 1821 for heating fluids and evolving gas in 1822 would not continue into zone 1810. In zone 1810, remaining ability of liquor in chamber 1821 to absorb gas and so produce heat, and remaining stored heat of both liquor and gas, would be used for rejecting heat, as generaly designated by wavy arrows 1899, into the cold heat sink generally designated 1898. HEat sink 1898 is depicted here as comprising a thermodynamic impedance with flow of working fluid generally designated 1900 entering at temperature T1994 and exiting at temperature T1995≦T1994, with which flow heat would be exchanged in counterflow. Liquor spilling over overspill 1920 in the direction indicated by arrow 1918, exiting from chamber 1821 through outlet 1919, and flowing through tube 1828 into trap 1880, would be substantially the most dilute liquor in device 1802.

This dilute liquor would then enter counterflow heat exchanger 1882, in which it would pass through a series of overspills and be heated in counterflow with chamber 1821, as discussed above. This would take place in zone 1809.

After this dilute liquor had been heated to a temperature T1985 sufficiently high for the liquor to evolve gas into the relatively high pressure gas, near gas pressure P1975, the liquor would begin to pass through a series of underspills, while being heated further by heat from chamber 1821. This would make the liquor warmer, and cause gas to be evolved from the liquor. This is a source of the high pressure gas used in chamber 1820. After the liquor had become sufficiently concentrated, the temperature required to drive further gas from the liquor would be greater than would be supplied by the absorption of gas into the liquor in chamber 1821. This marks the transition from zone 1808 to zone 1807.

In zone 1807, liquor in chamber 1822 proceeding generally in the direction indicated by arrow 1830 would be heated further by stored heat from liquor passing in counterflow through heat exchanger 1877, until the liquor in chamber 1822 had become too concentrated for the temperature available from heat exchanger 1877 to drive further evolution of gas at the relatively high pressure, about P1976, present there in chamber 1822. This partly concentrated liquor would then spill over into tube 1831, flow into reservoir 1833, proceed through trap 1835, and re-enter heating chamber 1815 connected to lift tube 1940, thus completing the loop of flow of the liquid coponent of the liquor.

Zones 1806, 1807, 1808, 1809, and 1810 of device 1802 may be regarded as a self-adjusting heat-driven pump for gas and liquid. This pumping of gas and liquid would drive the part of device 1802 which would operate at temperatures greater than T1992. The higher temperature part of device 1802, operating in zones 1804 and 1805, may be regarded as a self-adjusting gas-pressure-driven heat pump, for pumping some heat from the input in zone 1806 to the higher temperature output in zone 1804.

That the high-temperature part of device 1802 is self-adjusting with respect to load temperature may be seen by noting that, were it not for the use of part of the heat made available by the concentrated liquor's ability to absorb relatively high pressure gas at relatively high temperature, temperature T1989 would continue to become bigger until the intrinsic thermodynamic inefficiencies present in the counterflow heat-and-gas processes presented a limit, for example, as might happen by the liquor becoming so concentrated that minute inefficiencies of heat exchange between chambers 1820 and 1823 denominated. Because of the properties of rotary inertial thermodynamic systems, including, by way of example and without limitation, greatly enhanced convection, density gradient separation, film control, and the like, temperature T1989 might seem relatively conveniently self-adjusting over a relatively wide range of useful operating conditions.

The closed cycle device depicted in FIG. 76 can be converted to a device with a closed cycle for flow of absorbent fluid and an open cycle for flow of absorbed gaseous working fluid by: detaching trap 1850 from chamber 1823; removing the portion of connecting tube in trap 1850 which crosses connecting tube 1865, and connecting trap 1850 directly below seperator 1816 but oriented to deliver its output towards zone 1807 with a suitably long connecting tube to reach radially outward from separator 1816 to a new position for trap 1850 situating trap 1850 radially outward from connecting tube 1825; breaking connecting tube 1825 and connecting the outlet of trap 1850 to the portion of connecting tube 1825 reaching toward heat exchange means 1877 so as to deliver liquor to flow in the direction indicated by arrow 1826; breaking connecting tube 1864 and using it as the lower pressure input to carry input gas in the direction indicated by arrow 1862; breaking connecting tube 1865 and using it as the higher pressure output to carry output gas in the direction indicated by arrow 1879; removing the heat flow connection indicated by the wavy arrows passing through jagged lines 1948; and removing all the thus-disconnected apparatus lying zones 1804, 1805, and 1806, comprising chambers 1820 and 1823, heat exchange means 1905, trap 1857, 'J' tube 1946, and their associated connecting tubes and remaining portions of broken connecting tubes. For convenience in driving lift tube 1940 and/or in structure, separator 1816 might be moved radially outward to a position in which the last spill barrier in separator 1816, past which liquor would flow to spill into the outlet and then flow to trap 1850, would be slightly radially inward from the radially innermost edge 1942 of spill barrier 1944 in chamber 1821. With this configuration, the remaining heat driven gas pump means would with relatively high efficiency accept input gas and deliver output gas at approximately the temperatures found in zone 1806, which would then be the higher temperature portion of the remaining gas pump. For applications in which gas was input at a temperature lower than appropriate in zone 1806, the inlet could be taken at a suitable position along chamber 1821, with the lowest temperature input being positioned in the radially inward portion of chamber 1821 near the end of chamber 1821 at which liquor leaves through outlet 1919 and the highest temperature being the location depicted in FIG. 76. If the gas entering chamber 1821 were at a temperature low enough for absorption without any precooling, then chamber 1821 might advantageously be closed so as to have the 'left' end in FIG. 76 correspond to the 'left' end of zone 1808, reaching no farther 'left' than inlet 1879. If a higher temperature for input gas were desired, counterflow heat exchange might advantageously be used to use heat from that input gas to provide heat to chamber 1815 to drive lift tube 1940 and/or to deliver heat to separator 1816, replacing all or part of those heat inputs provided by heat input 1813 through thermodynamic impedance Z1965 in Zone 1806.

To provide gas output at a temperature lower than that which would be provided through duct 1865, a gas outlet might advantageously be connected at a suitable position anywhere along the length of separator 1816, connecting tube 1866, and/or chamber 1822, with lower output gas temperature obtained by connecting an output tube farther to the 'right' and a higher output gas temperature being obtained by connecting an output tube farther to the 'left'. Lower gas output temperature than that which would be obtained by connecting an output tube to the radially innermost portion of the end of chamber 1822 close to liquor inlet 1964 might be obtained by providing for counterflow heat exchange with heat exchanger 1882; and, for lower output temperature than that which would be so obtained, by providing for heat rejection into the low temperature heat sink 1898 in zone 1810.

It would not be necessary for all of the input gas to be input at the same temperature: more than one input connection tube might be positioned according to the input temperature. Similarly, it would not be necessary for all of the output gas to be delivered at the same temperature: more than one output connection tube might be positioned as appropriate for the various output temperatures desired. And, similarly, the heat driven gas pump would be able to accept input gas and deliver output gas at different temperatures.

This ability to choose a wide range of operating conditions appears from use of relatively 'tight' thermal coupling between gas and liquor in the separator and between gas and/or liquor in chambers 1821 and 1822 and counterflow heat exchangers 1877 and 1882, with heat flowing between fluids flowing in the same or in different directions (according to where inlet(s) and outlet(s) would be positioned) so as to keep fluids in each radial 'slice' at close to the same temperature as each other, as was discussed herein with regard to heat exchange means and location 1920, 1921, and 1922.

It should be understood that the example given here may be altered in accordance with rotary inertial thermodynamics, for example, as by making use of various of the many configurations and methods set forth elsewhere herein, without departing from the scope of the invention.

HEAT-DRIVEN GAS PUMP WITH COUNTERFLOW HEAT EXCHANGE

FIG. 79 schematically depicts a heat-driven gas pump, generally designated 2100, with wavy arrows indicating flow of heat. In device 2100, an absorptive liquor 2120 (also designated by the letter "L") is pumped by pump means 2113 around a closed loop comprising conduct 2135, counterflow heat exchange means 2121, relatively high pressure desorption chamber 2122, conduit 2123, counterflow heat exchange means 2124, expansion valve 2112, relatively low pressure absorption chamber 2125, conduit 2126, and pump means 2113. Gas 2128 (also designated by the letter "G") enters are relatively low pressure through inlet 2129 flowing generally in the direction indicated by arrow 2130, passing through counterflow heat exchange means 2131 in the direction generally indicated by dashed arrows 2132, and on into absorber 2124, in which the gas flows in the general direction indicated by the dashed arrows 2133 and is absorbed by liquor 2120 via the gas-liquid interface which here is very generally depicted by the dash-dot-dot line 2134. In desorption chamber 2122, gas 2128 is delivered at relatively high pressure via the liquid-gas interface which here is very generally depicted by the dash-dot-dot line 2136, flows generally in the direction indicated by dashed arrows 2137, passes through counterflow heat exchange means 2138 in the direction generally indicated by dashed arrows 2139, and exits through outlet 2140 in the direction generally indicated by arrows 2141.

Figure 81A:
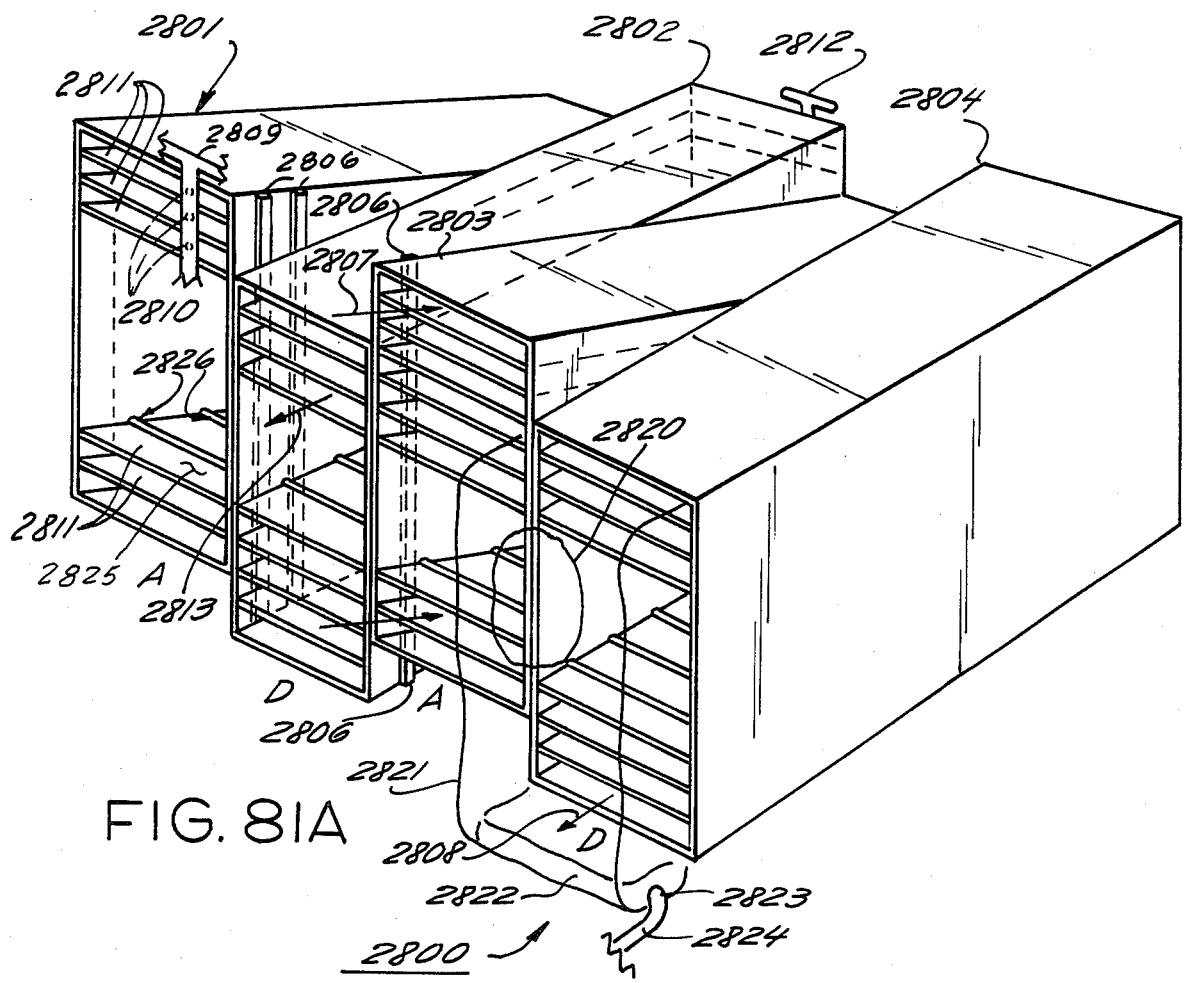
FIGS. 81A and 81B are views of portions of the structure of FIGS. 79 and 80.

At each location of flow in the various chambers as depicted schematically in FIG. 79, all of the fluid(s) located along a line drawn parallel to dotted line 2127 are in close thermal heat exchange with each other, as provided for by suitable heat exchange means, various examples of which are discussed elsewhere herein and in my copending U.S. Pat. No. 4,524,587. For proper operation, these substances are not in close thermal heat exchange along a direction substantially perpendicular to the direction of dotted line 2127. Ways of providing such substantial segregation are provided by, for example, proper use of overspills and/or underspills as discussed elsewhere herein, or by the use of ramps for flow as depicted in FIG. 81A.

Heat which drives operation of device 2100 enters through thermodynamic impedance Z2142 from source with temperature T2901 and heat is rejected at a lower temperature T2901 through thermodynamic impedance Z2143, in each case through suitable counterflow exchange of heat. Temperatures $T2144 > T2145$, $T2146 > T2147$; pressures $P2148 > P2149 > P2164 > P32166 > P2162 > P2161$.

Counterflow heat exchange between counterflow heat exchangers 2131 and 2138 allows T2165 and T2164 to be close to each other while varying according to what may be appropriate for the gas-flow load which is being driven.

Figure 82:
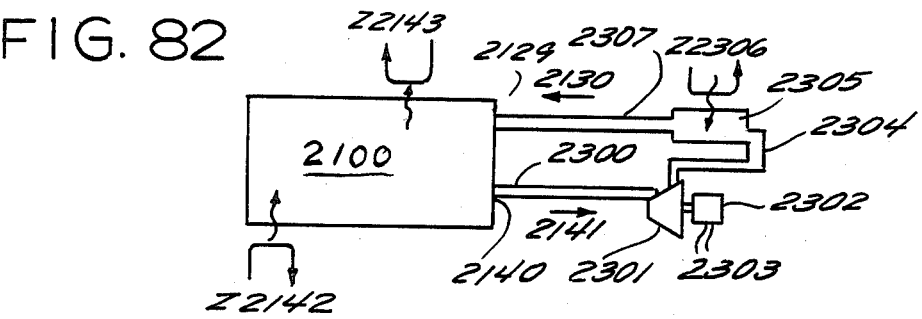

Once such application, for example, might be for the cogeneration of electric power and air conditioning. FIG. 82 depicts schematically a heat-driven gas pump using device 2100 of FIG. 79, with relatively high pressure gas delivered through its outlet 2140 flowing through conduit 2300 to an expansion turbine 2301 to drive a generator 2302 delivering electrical output through suitable electrical cable 2303; with the turbine 2391 delivering expanded, and cooler, gas through conduit 2304 to counterflow heat exchange means 2305, to provide cooling by receiving heat at relatively low temperature through thermal impedance Z2306; with the return gas proceeding through conduit 2307 to reenter compressor 2100 through its inlet 2129. It should be understood that a multi-stage expansion turbine can be used, if desired, with interstage use of the expanded gas to receive heat from the medium to be cooled; such an arrangement might be convenient if heat source impedance Z2306 is relatively low. It should be noted that the turbine would run cold, providing an environment in which many relatively low cost and/or high performance materials can be advantageously used. For example, a hermetically sealed turbogenerator could use plastics and could use magnets made of rare earth, iron, and boron.

Figure 80:
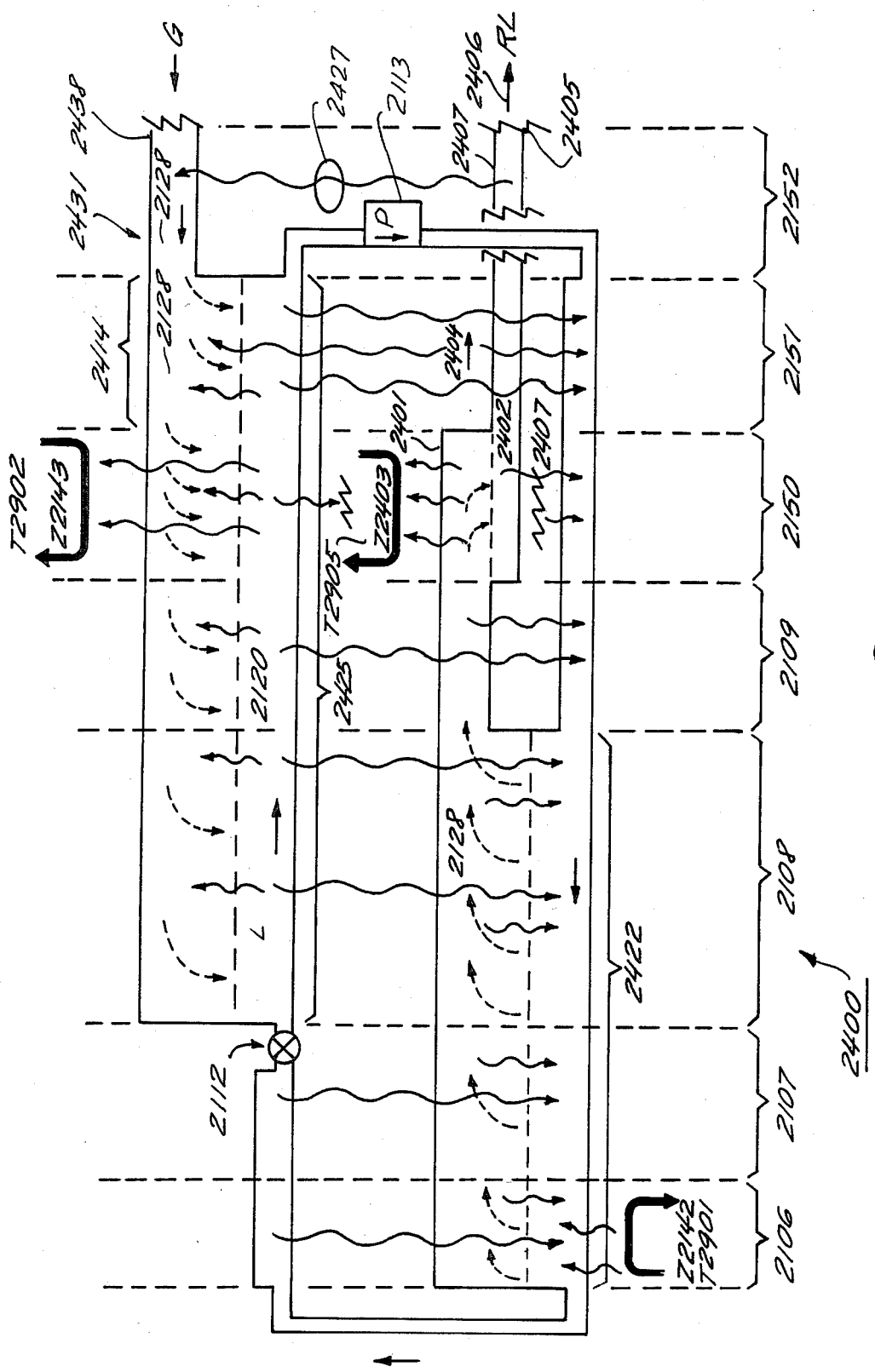

In FIG. 80 is depicted device 2400, which differs from device 2100 in two ways; One way is that gas at relatively high pressure is condensed in a condenser 2401, delivering heat output through impedance Z2403. Condensed working fluid 2402 then passes through counterflow heat exchange means 2407 flowing generally in the direction indicated by arrow 2404 to exit through outlet 2405, flowing in the direction generally indicated by arrow 2406 as a liquid (here labeled "RL" to indicate that this can be used with a refrigerant liquid). The other way is that provision is made for a portion 2414 of the absorber to be cooled by cold vapor to a temperature below that provided for by rejection of heat impedance Z2413. For use with refrigerants which have a greater heat capacity per unit mass in the gaseous state than in the liquid state, such cooling would provide for greater amount of volatile component in the liquor when it entered desorption chamber 2422, and thus provide for a greater range of temperature for zone 2108, in which absorption in chamber 2425 would be able to drive desorption in chamber 2422.

In FIG. 79, zones 2106, 2107, 2108, 2109, 2110 and 2111 indicate where specific processes take place. In each of these zones counterflow heat exchange takes place between fluids [gases(es) and/or liquid(s)] flowing in opposite directions. In zone 2106, relatively high-temperature heat is delivered in counterflow heat exchange to a relatively hot liquor from which a relatively large portion of the absorbed gas has already been driven; this heat enters in part through thermal impedance Z2142, and part comes from liquor in counterflow heat exchanger 2124. Liquor 2120 in desorption chamber 2122 flows in direction generally indicated by arrow 2119, liquid 2120 in counterflow heat exchanger ("CFHE") 2124 flows in the direction generally indicated by arrow 2115.

In zone 2107, liquor 2120 in CFHE 2124 gives up heat to liquor in desorption chamber 2122 to drive desorption of gas 2128 from liquor 2120. In this process, the temperature of liquor flowing in CFHE 2124 is decreased to a temperature T2146 low enough for it to be able to come into contact with gas 2128 at pressure P2161 in absorption chamber 2125 without desorption occurring on exposure. Liquor 2120 then passes through expansion valve 2112 and proceeds into absorption chamber 2125.

In zone 2108, gas 2128 is absorbed into liquor 2120, and the resulting heat of absorption, and latent heat, are delivered in counterflow heat exchange to drive desorption in desorption chamber 2122 and raise the temperature of the liquor 2120 therein; and some is delivered, also in counterflow, to preheat gas 2128 in absorpton chamber 2125 prior to absorption of that part of the gas. This continues until the liquor moving along in chamber 2125 generally in the direction indicated by arrow 2116 is no longer able to absorb gas 2128, at the pressure with which it is presented to that part of the liquor in that part of chamber 2125, at a temperature high enough for the resulting heat of absorption to drive desorption in chamber 2122.

In zone 2109, further heat, latent and/or of absorption, from liquor in chamber 2125 is used to preheat liquor in CFHE 2121 to a temperature T2145 high enough so that when the liquor 2120 (with its relatively large amount of absorbed gas) is exposed to gas 2128 at pressure P2149 it will not absorb that gas.

In zone 2110, heat of absorption in chamber 2125 is largely rejected in counterflow heat exchange via thermal impedance Z2143; latent heat of liquor in chamber 2125 is exchanged in counterflow to liquor in CFHE 2121 to preheat that liquor.

In zone 2111, counterflow heat exchange takes place between gas 2128 in CFHE 2131 and gas 2128 in CFHE 2138. This automatically provides for following changes in temperature associated with apparatus driven by the gas-pump, without disrupting the operation of the heat-driven gas-pump itself.

FIG. 79 depicts optional port 2170 on desorption chamber 2122 and/or CFHE 2138. Shifting optional port 2170 in the direction generally indicated by arrow 2171 would provide for obtaining output gas at a lower temperature; shifting optional port 2170 in the direction generally indicated by arrow 2172 would provide for obtaining gas output at a higher temperature. A similar optional port 2173 is depicted for absorption chamber 2125 and/or CFHE 2131 and/or optioal CFHE 2701. Shifting optional port 2173 in the direction generally indicated by arrow 2174 would provide for admitting gas at a relatively lower temperature into a portion of chamber 2125 and/or CFHE 2131 in which the gas 2128 was at approximately the same temperature as the incoming gas; similarly, shifting port 2173 in the direction generally indicated by arrow 2175 would provide for admitting gas at a relatively higher temperature into a portion of chamber 2125 and/or optional CFHE 2701 in which the gas 2128 was at approximately the same temperature as the incoming gas. This ability to approximately match temperatures can be of significance for obtaining relatively high thermodynamic efficiency.

Figure 86:
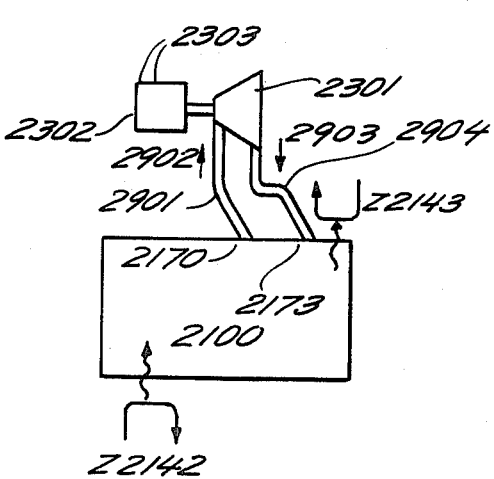
FIGS. 82, 83, 84, 85 and 86 are schematic drawings showing additional embodiments of the invention.

For example, in FIG. 86 is depicted schematically an arrangement of output port 2170 and inlet port 2173, in which the temperature drop arising from passage of the gas through expansion turbine 2302 would correspond to the usual difference between those two portions and thus would not result in substantial thermodynamic loss of mixing gases with substantial temperature difference. Such configuration might be of use in generating power, for example, using a relatively simple turbine with a working gas having a relatively high molecular weight; and/or for auxiliary and/or emergency power production. In particular, gas would exit from heat-driven gas compressor 2100 via port 2170, pass through conduit 2901 in the direction generally indicated by arrow 2902; drive expansion turbine 2301, driving generator 2302 to deliver electric power through electrical cable 2302; exit from turbine 2301 at a lower temperature, passing through conduit 2904 in the direction generally indicated by arrow 2903; and re-enter gas compressor 2100 through inlet port 2173 positioned so as to receive that gas into a region in device 2100 where the gas present would have approximately the same temperature as the gas entering. Note that the amount of temperature drop in turbine 2301 can be affected by amount of electrical load on generator 2302.

In FIG. 79 are schematically depicted two optional ports, one for delivering and the other for receiving gas at relatively high temperature(s). Optional CFHE 2702 is situated to receive gas from the hottest region of gas in desorption chamber 2122 and deliver it to optional outlet port 2705, to exit in the direction generally indicated by arrow 2706. Optional CFHE 2701 is situated to receive relatively hot. gas entering through optional inlet port 2703 and proceeding in the direction generally indicated by arrow 2704, and to deliver it to absorption chamber 2125. These optional ports 2703 and 2705 and optional CFHEs 2701 and 2702 provide for using device 2100 to pump gas through apparatus operating at a temperature(s) greater than the highest temperature, T2144, that occurs in desorption chamber 2122, and, under suitable circumstances, greater than the temperature T2901 of the input heat which drives device 2100. Such an application is schematically depicted in FIG. 83.

It should be understood that a plurality of inlet and/or outlet ports can be present at the same time, and that the number of inlet ports does not have to be the same as the number of outlet ports.

Except for the operation of pump 2113 and expansion valve 2112, the operation of device 2100 is approximately thermodynamically reversible. In particular, expansion valve 2112 would be replaced with optional pump 2501, pump 2113 would be replaced with optional expansion valve 2502, and every arrow designating flow, whether of gas, liquor, and/or heat, would be reversed. For convenience, I have designated this optional configuration 2100R, with the suffix R used with all arrows and ports.

Figure 83:
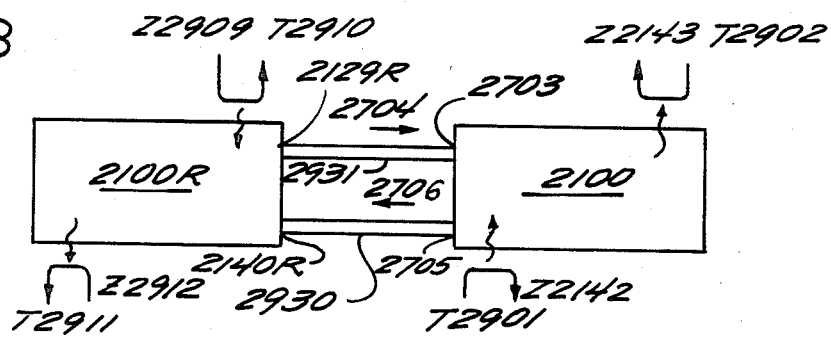

In FIG. 83 is schematically depicted a device 2100 driving a device 2100R, with the corresponding ports numbered as in FIG. 79. In particular, heat entering device 2100 from a source with temperature T2901 through thermal impedance Z2142 with heat of temperature T2902 less than T2901 being rejected through thermal impedance Z2143 would pump gas out through optional port 2705 in the direction generally indicated by arrow 2706 to flow through conduit 2930 and enter device 2100R through its inlet port 2140R. Relatively low pressure gas would then exit from device 2100R through it outlet port 2129R to pass through conduit 2931 to enter device 2100 through optional port 2703, proceeding in the direction generally indicated by arrow 2704. This would result in the pumping of heat received through thermal impedance Z2909 from a source with temperature T2910 to be delivered at temperature T2911 greater than T2910 through thermal impedance Z2912.

Figure 84:
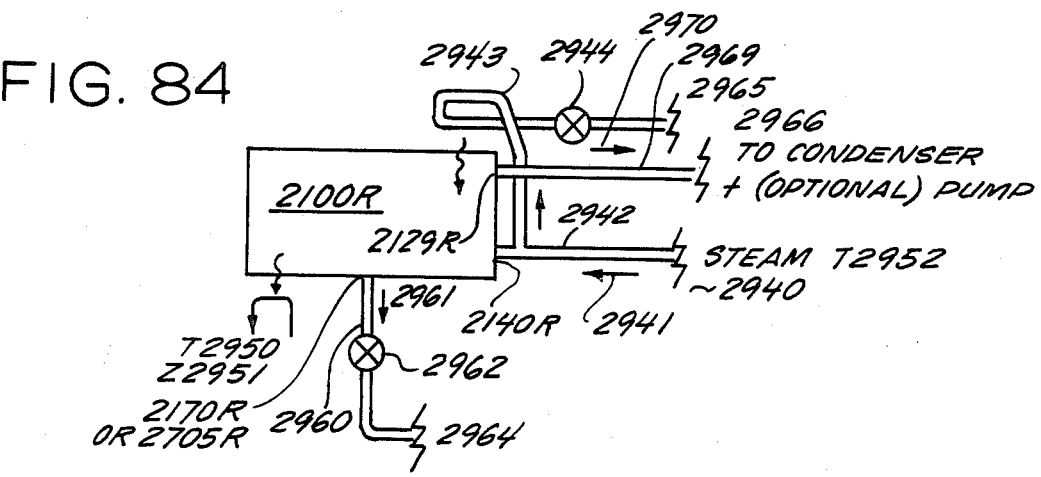

In FIG. 84 is depicted another application for device 2100R. In this example, steam would be used to drive a device which used $H_2O$ as the gas, for example, using a salt solution, or sulfuric acid, or sodium hydroxide, or such other absorption liquor as was appropriate. Steam 2940 is depicted as proceeding in the direction generally indicated by arrow 2941 through conduit 2942 to enter device 2100R through its inlet port 2140R. Optional port 2170R or 2705R would provide for removal of non-absorbed gases through conduit 2960, valve 2962, and to disposal means 2964; if above ambient pressure and safe to vent, possibly to vent, or if of lower than ambient pressure or otherwise not suitable for venting, to condenser and/or pump, and/or other appropriate means. Steam 2940 would also proceed into condenser 2943 to provide input heat for device 2100R, with condensate proceeding through valve 2943 to disposal means 2965. Low pressure gas would leave device 2100R through its outlet port 2129R, proceeding in the direction generally indicated by arrow 2970 through conduit 2969 to an appropriate disposal means 2966 providing sufficiently low back pressure, such as, by way of example and without limitation, a condenser with, if appropriate, pump means for removing excess non-condensed gas(es). In this configuration, device 2100R would deliver heat at temperature T2950 greater than T2952 through thermal impedance Z2951.

In FIG. 80, thermodynamic operations performed in zones 2106, 2107, 2108, and 2109 would be substantially the same as those taking place in the correspondingly numbered zones in FIG. 79.

In zone 2150, gas 2128 would condense to form liquid 2402, rejecting heat of condensation through thermal impedance Z2403.

In zone 2151, cold gas would be used in portion 2414 of chamber 2425 to decrease the temperature of liquor 2120 by counterflow heat exchange facilitating further absorption, as discussed elsewhere herein.

In zone 2152, heat is exchanged in counterflow between gas 2128 in CFHE 2431 and liquid in CFHE2407

Wavy arrows 2185 in zone 2111 of FIG. 79, or wavey arrow 2427 in zone 2152 of FIG. 80, could point in either direction, depending on what is happening outside device 2100 or device 2400, respectively.

In FIG. 81A is depicted a partly cut away perspective view of an absorption-desorption counterflow heat exchanger generally designated 2800, with portions of liquor distribution manifolds 2809 and 2812 and slot sets 2801, 2802, 2803, and 2804 of sloped channel-bodies in which both gas and liquor would flow. Substantially vertical heat pipes 2806, of which for simplicity only three are depcited, would help provide relatively close thermal contact between regions for which such relationship is appropriate, as discussed herein in relation to FIG. 79 and dotted line 2127.

Sets 2801 and 2803 are here designated "A", to indicate that they would comprise part of, for example, absorption chamber 2125 of FIG. 79. Sets 2802 and 2804 are here designated "D", to indicate that they would comprise part of, for example, desorption chamber 2122 of FIG. 79. In such case, device 2800 would, for exmaple, comprise apparatus for performing absorptive-desorptive counterflow heat exchange appropriate for zone 2108 of FIG. 79.

In particular, liquor containing relatively little dissolved gas would be delivered by manifold 2809 through multiple aperture 2810 to flow done along the lower (or radically further out) surfaces respectively of slots 2811, for example, surface 2825; on surface 2825 are depicted small ridges 2826 which would serve not only to help spread the flow of liquor across the full width of the sloped surface but alos to help provide mixing, thus reducing the means diffusion distance for gas absorption, and/or desorption. Part of a manifold is depicted for slot set 2804, comprising gas container 2821, with gas port 2820, liquor collector 2822, liquor outlet 2823, and part of liquor conduit 2824.

Figure 81B:
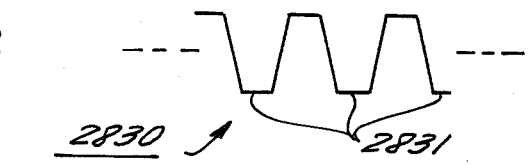

To facilitate thermal communication between gas and liquor, a slotted and/or perforated, thermally conductive spring can be placed within each slot, to form a xog-zag between the top and the bottom of the slot. This is generally depicted in FIG. 81B as 2830. Bottommost portions 2831 would be sprung against the bottom surface inside the slot, and could serve the purpose of ridges 2826. Successive openings can be staggered, so as to increase heat transfer with gas and/or liquor and to increase mass transfer between gas and liquor. Such springs might be installed by, for example, using compressed air to send a hook with cord through the slot from the far end, engaging one end of the spring with the hook, stretching the spring, positioning it in the slot while it was under tension, and them allowing it to relax and spring against the top and bottom surfaces of the slot; such an operation might be automated with, for example, indexing to successive slots.

For additional length, devices 2800 can be connected in series, with pumps to pump collected liquor into the appropriate liquor distribution manifolds for successive sections and with gas flow connected in series.

Figure 85:
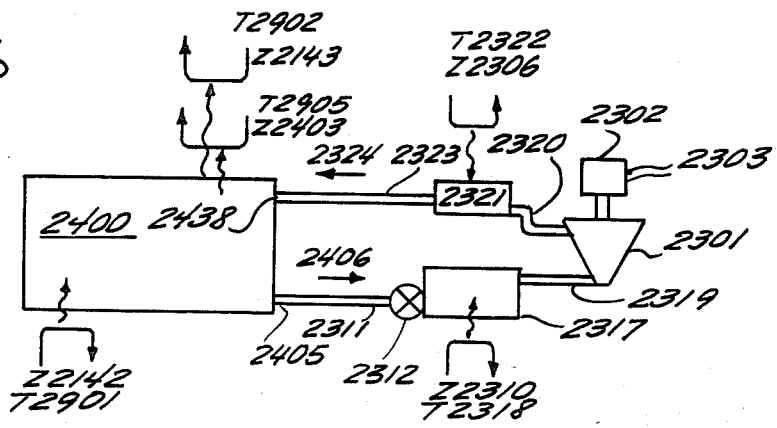

In FIG. 85 is schematically depicted a configuration in which device 2400 provides liquified refrigerant through output port 2405, which liquid refrigerant proceeds in the direction generally indicated by arrow 2406 though conduit 2311 and expansion valve 2312 to evaporation chamber 2317 when it evaporates at relatively low pressure, thus accepting heat at relatively low temperature T2318 through thermal impedance Z2310; this gas then proceeding through conduit 2319 to enter and drive expansion turbine 2301 and electric generator 2302 to deliver electrical output through electrical cable 2303; said gas then leaving expansion turbine 2301 with lower temperature than when it entered and proceeding through conduit 2320 to CFHE 2321 where it accepts heat through thermal impedance Z2306 from source with relatively low temperature T2322; and said gas then proceeding in the direction generally indicated by arrow 2324 through conduit 2323 to enter device 2400 through its inlet 2438.

This operating cycle would provide for adjusting what portion of the thermodynamic output of device 2400 was used for generating electric power and what portion was used for pumping heat.

What is claimed is:

1. An absorptive thermodynamic device including an absorber chamber in which a gas is absorbed in an absorbant liquid, a separator chamber having means for conducting heat into a liquid in said chamber to drive said gas out of said liquid, means for pumping said liquid through a closed circuit path including said absorber and separator chambers, and means for conducting from said absorber chamber to said separator chamber heat developed by the absorption of said gas in said liquid.

2. A device as in claim 1 including a condenser chamber and an evaporator chamber connected to one another in series, first conduit means for conducting gas from said separator chamber to said condenser chamber, second conduit means for conducting evaporated gas from said evaporator chamber to said absorber chamber, and means for conducting heat from the environment into said evaporator chamber to perform cooling.

3. A device as in claim 1 in which each of said separator and absorber chambers is elongated and has an inlet and an outlet adjacent opposite ends thereof, including means forming a low thermal impedance coupling between said chambers over a substantial portion of their lengths, said inlet and outlet of each chamber being positioned so that the liquid in said separator chamber flows in a direction opposite to the direction in which the liquid flows in said absorber chamber.

4. A device as in claim 3 including means for minimizing heat transfer longitudinally in said chambers relative to heat transfer transversely of said chambers.

5. A device as in claim 4 in which the last-named means includes means for causing the liquid in each of said chambers to flow in a relatively thin layer along wall of said chamber.

6. A device as in claim 3 in which at least one of said chambers is arranged at an acute angle to the direction of the gravity or other acceleration field in which said device is located.

7. A device as in claim 1 in which said device is stationary and utilizes the force of gravity to aid at least some of the flow of liquids in said device.

8. A device as in claim 1 including means for conducting relatively high-pressure gas from a location in said closed circuit path to an expansion turbine to do work, and for conducting the gas from said turbine back to another location in said closed circuit path.

9. A device as in claim 8 including a heat exchanger connected to exchange heat with fluid flowing between said location in said closed circuit path and said turbine to do cooling simultaneously with the operation of said turbine.

10. A device as in claim 8 including an electrical generator drivably coupled to said turbine.

11. A device as in claim 8 in which the gas reaching said turbine has a temperature below about 100° C, and above about minus 40° C.

12. A device as in claim 8 including an evaporator connected between a location in said closed circuit path and said turbine for receiving liquified gas from said location and converting it to a gas.

13. A thermodynamic method comprising the steps of:
(a) pumping an absorbant liquid through a closed circuit conduit with a gas in said conduit capable of being absorbed into said liquid; (b) removing heat from said liquid and causing said gas to be absorbed in said liquid in a first portion of said conduit; (c) adding heat to said liquid and driving said gas out of said liquid in a second portion of said conduit; and (d) transferring heat from said first portion to said second portion of said conduit.

14. A method as in claim 13 in which said portions are elongated and aligned closely adjacent one another over a substantial length, with the fluids flowing therein in opposite directions.

15. A method as in claim 13 in which said device is stationary and in which gravity is used to aid the flow of at least a portion of the liquid in said device.

16. A method as in claim 14 including the step of minimizing heat transfer longitudinally of said conduit portions relative to heat transfer transversely of said conduit portions.

17. A method as in claim 15 in which the last-recited step includes causing the liquid in said chamber to spread into a relatively thin layer in contact with high-heat-conductive walls in transverse contact with one another.

18. An absorptive thermodynamic device including pump means for pumping an asborbant liquid with a gas capable of being absorbed into said liquid through a closed circuit conduit, said conduit including multiple elongated parallel conduit sections aligned at an acute angle to the acceleration field in which said device is located, one section of said conduit comprising a separator chamber, and another section comprising an absorber chamber, the flow in said chambers being in opposite directions, and the angles at which said chambers are aligned being opposed, with said chambers in thermal contact at their sides, said chambers being relatively wider than they are tall so as to provide a relatively large bottom surface area.

19. A device as in claim 18 in which said conduits are arranged in a crossing pattern.

20. A device as in claim 18 in which the bottom wall of said conduit has flow obstructions for producing turbulence in the liquid flowing thereon to enhance absorption or desorption of gas.

* * * * *